(12) United States Patent
Tiesler

(10) Patent No.: US 7,140,675 B2
(45) Date of Patent: Nov. 28, 2006

(54) CONSOLE FOR MOTOR VEHICLES

(75) Inventor: John M. Tiesler, Harrison Township, MI (US)

(73) Assignee: Lear Corporation, Southfield, MI (US)

( * ) Notice: Subject to any disclaimer, the term of this patent is extended or adjusted under 35 U.S.C. 154(b) by 238 days.

(21) Appl. No.: 10/368,527

(22) Filed: Feb. 18, 2003

(65) Prior Publication Data

US 2004/0160087 A1     Aug. 19, 2004

(51) Int. Cl.
*B60N 3/00*     (2006.01)
*B60R 7/04*     (2006.01)

(52) U.S. Cl. .................... 296/214; 296/37.7; 296/37.8; 296/210; 224/311

(58) Field of Classification Search ............... 296/214, 296/37.1, 37.7, 37.8; 224/281, 311, 328, 224/552, 214, 555, 282, 546–548, 553, 557, 224/929
See application file for complete search history.

(56) References Cited

U.S. PATENT DOCUMENTS

| | | | |
|---|---|---|---|
| 3,685,708 A * | 8/1972 | Herrington | 224/483 |
| 4,180,299 A * | 12/1979 | Tolerson | 312/242 |
| 4,738,481 A | 4/1988 | Watjer et al. | |
| 4,783,110 A | 11/1988 | Beukema et al. | |
| 4,844,305 A * | 7/1989 | McKneely | 224/404 |
| 4,867,498 A * | 9/1989 | Delphia et al. | 296/37.7 |
| 4,884,733 A * | 12/1989 | Geeves | 224/311 |
| 4,893,867 A | 1/1990 | Hilborn et al. | |
| 5,161,700 A * | 11/1992 | Stannis et al. | 211/175 |
| 5,186,517 A | 2/1993 | Gilmore et al. | |
| 5,199,772 A * | 4/1993 | Jordan | 312/7.1 |
| 5,282,556 A * | 2/1994 | Bossert | 224/540 |
| 6,024,262 A * | 2/2000 | Duncan | 224/311 |
| 6,092,704 A * | 7/2000 | Baumeister | 224/275 |
| 6,176,536 B1 * | 1/2001 | Miller et al. | 296/37.7 |
| 6,267,428 B1 | 7/2001 | Baldas et al. | |
| 6,338,517 B1 * | 1/2002 | Canni et al. | 296/37.8 |
| 6,575,528 B1 * | 6/2003 | Tiesler et al. | 296/214 |
| 6,616,206 B1 * | 9/2003 | Luginbill et al. | 296/37.8 |
| 6,619,716 B1 * | 9/2003 | Sturt | 296/37.8 |
| 6,669,260 B1 * | 12/2003 | Clark et al. | 296/37.8 |
| 2002/0163219 A1 * | 11/2002 | Clark et al. | 296/37.8 |

* cited by examiner

*Primary Examiner*—D. Glenn Dayoan
*Assistant Examiner*—Greg Blankenship
(74) *Attorney, Agent, or Firm*—MacMillan, Sobanski & Todd, LLC

(57) ABSTRACT

A console for motor vehicles comprises a bezel and a divider. The bezel defines an opening for receiving one or more modules. The divider is releasably attached to the bezel to divide the opening into a plurality of slots. Each slot is provided for receiving a separate module.

17 Claims, 4 Drawing Sheets

CONSOLE FOR MOTOR VEHICLES

BACKGROUND OF INVENTION

This invention relates in general to motor vehicles and, in particular, to a console for motor vehicles.

Motor vehicle consoles are well known. Such consoles are typically equipped with various displays, controls, and convenience features that are accessible to occupants of the vehicle. For example, some consoles include display screens, climate controls, light modules, and storage compartments.

Overhead consoles are typically attached to the roof of the motor vehicle. Such consoles are usually centrally located along the longitudinal axis of the roof and extend toward the rear of the vehicle from a front edge of the roof panel adjacent the windshield. Overhead consoles are manufactured in various lengths, depending on the features in the console. For example, a console having a display and light modules can have a longitudinal length of about 4-inches (10 cm). Consoles having more features, such as controls for various systems of the vehicle and multiple storage compartments, can extend into the rear portion of a passenger compartment of the vehicle, behind the front occupants.

Typically, overhead consoles include a single plastic housing that extends the entire length of the console. The housing includes slots or openings formed therein for receiving displays or controls, or access doors leading to storage compartments. Generally, a single console is designed for each particular motor vehicle platform due to the difference in the shapes and sizes of roof panels. In some vehicle platforms, certain modules are standard while others may be optionally purchased features of the vehicle. Since the overhead console is a singular unit formed from a single housing, the vehicle purchaser must elect to buy the entire console, even though the purchaser may only want certain features built therein.

What is needed is a console that can be more conveniently configured according to the vehicle platform and the vehicle purchaser's needs.

SUMMARY OF INVENTION

The present invention is directed toward a console for motor vehicles that can be easily configured according to a particular vehicle platform and vehicle purchaser's needs. The console is adapted to retain modules in the motor vehicle. The console comprises a bezel and a divider. The bezel defines an opening for receiving one or more modules. The divider is releasably attached to the bezel to divide the opening into a plurality of slots. Each slot is provided for receiving a separate module.

Various objects and advantages of this invention will become apparent to those skilled in the art from the following detailed description of the preferred embodiment, when read in light of the accompanying drawings.

DETAILED DESCRIPTION

Figure 1:
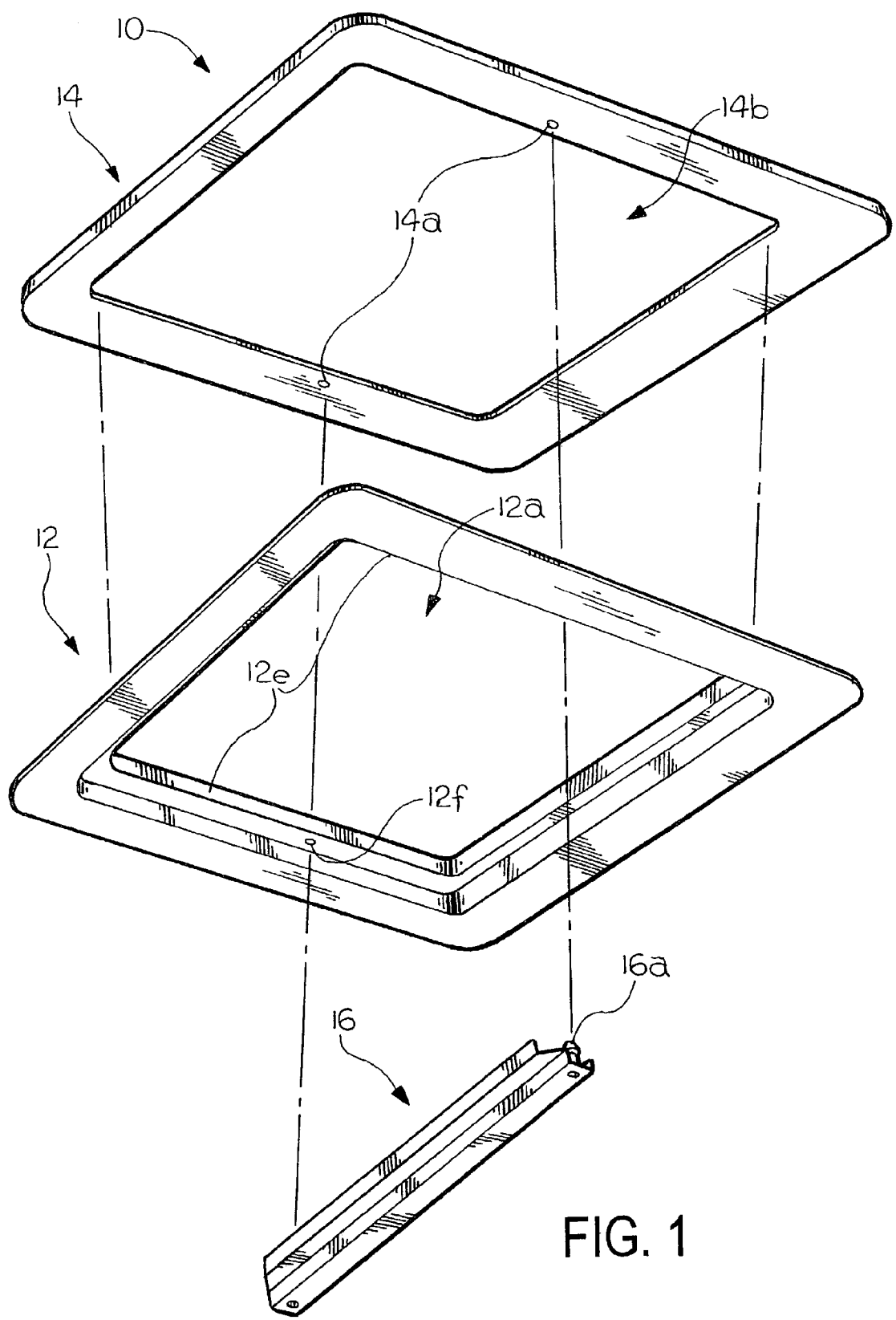
FIG. 1 is an exploded perspective view of a console according to the present invention showing up to two slots formed therein for receiving modules.

Now with reference to the drawings, there is illustrated in FIG. 1 an overhead console, generally indicated at 10, in accordance with the present invention. The console 10 is adapted to be attached to the roof of a motor vehicle (not shown). The console 10 is a modular design in that the console 10 is constructed for retaining multiple units or modules, wherein each module is separate and independent from each other module. The modularity of the console 10 enables a vehicle purchaser or consumer to select a number of desired modules and install them together.

The console 10 according to the invention includes a decorative bezel 12 and a support frame or retainer 14 for attaching the bezel 12 to the roof structure or an interior roof panel of the motor vehicle. The bezel 12 defines an opening 12a for receiving a module. The opening 12a can be divided into a plurality of slots by a divider 16, wherein each slot is provided for receiving a separate module.

Figure 3A:
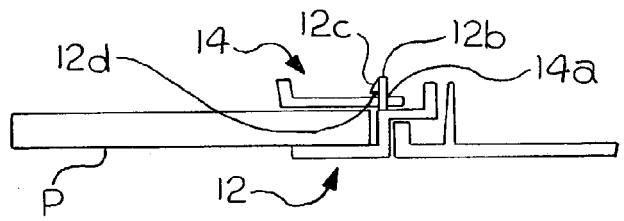
FIGS. 3A–3F are partial sectional views of various structures for attaching the console to the roof of a motor vehicle and further for attaching modules or dividers to the console.
Figure 3B:
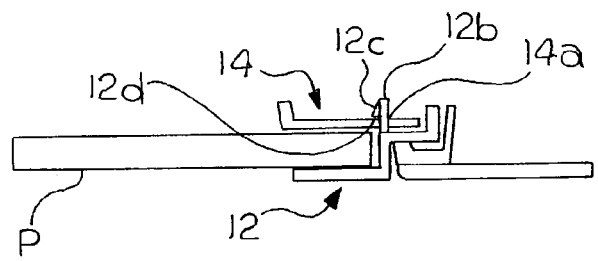

The bezel 12 is preferably made of a molded material, such as any of the various known plastics, and serves as a housing for the modules received therein. The bezel 12 substantially conforms to the curvature of the roof panel P of the motor vehicle. The bezel 12 has a plurality of spaced fasteners 12b, as illustrated in FIGS. 3A and 3B, which are molded integrally with the bezel 12 so as to extend upwardly and outwardly therefrom. The fastener 12b is preferably in the form of a snap fastener having a ramped surface 12c and an undercut shoulder 12d. The ramped surface 12c is adapted to be forced into a mating socket 14a in the retainer 14 until the undercut shoulder 12d snaps over an edge of the socket 14a. Once snapped into the socket 14a, the fastener 12b is resistant to separation and thereby functions to hold the bezel 12 in place.

The retainer 14 is preferably made of metal or rigid plastic. The retainer 14 abuts the upper surface of the roof panel and preferably defines a passage 14b therethrough, as illustrated in FIG. 1, for receiving the bezel 12 and one or more modules. The retainer 14 can be in the form of a plate or spaced rails. Though the retainer 14 is illustrated as a separate component, it can be molded into or formed as an integral part of the roof panel.

The retainer 14 has a plurality of sockets therein, such as the socket 14a illustrated in FIG. 3A, for receiving bezel fasteners 12b. When the fasteners 12b are snapped into the mating sockets 14a, the bezel 12 is brought into abutment with the roof panel of the motor vehicle, substantially flush with the lower surface of the roof panel. The bezel 12 frames out an opening in the roof panel. The fasteners 12b can be removed from the mating sockets 14a by moving the undercut shoulder 12d out of engagement with the edge of the socket 14a.

The divider 16 is preferably made of a molded material similar to that of the bezel 12. The divider 16 is elongated in shape and has opposing ends having resilient fasteners 16a extending therefrom. The fasteners 16a are preferably molded integrally with the divider 16 so as to extend upwardly and outwardly therefrom. The divider 16 extends laterally across the opening 12a in the bezel 12 and the fasteners 16a engage opposing sides 12e of the bezel 12 to attach the divider 16 thereto. In a preferred embodiment of the invention, the bezel 12 has a plurality of sockets 12f formed therein for receiving the divider fasteners 16a. The fastener 16a is adapted to snap into the mating socket 12f. Once snapped into the socket 12f, the fasteners 16a are resistant to separation and thereby hold the divider 16 in place relative to the bezel 12. The fasteners 16a are preferably snap fit fasteners, similar to the fasteners 12b of the bezel 12 set forth above, and the sockets 12f are preferably similar to the sockets 14a formed in the retainer 14.

Figure 2:
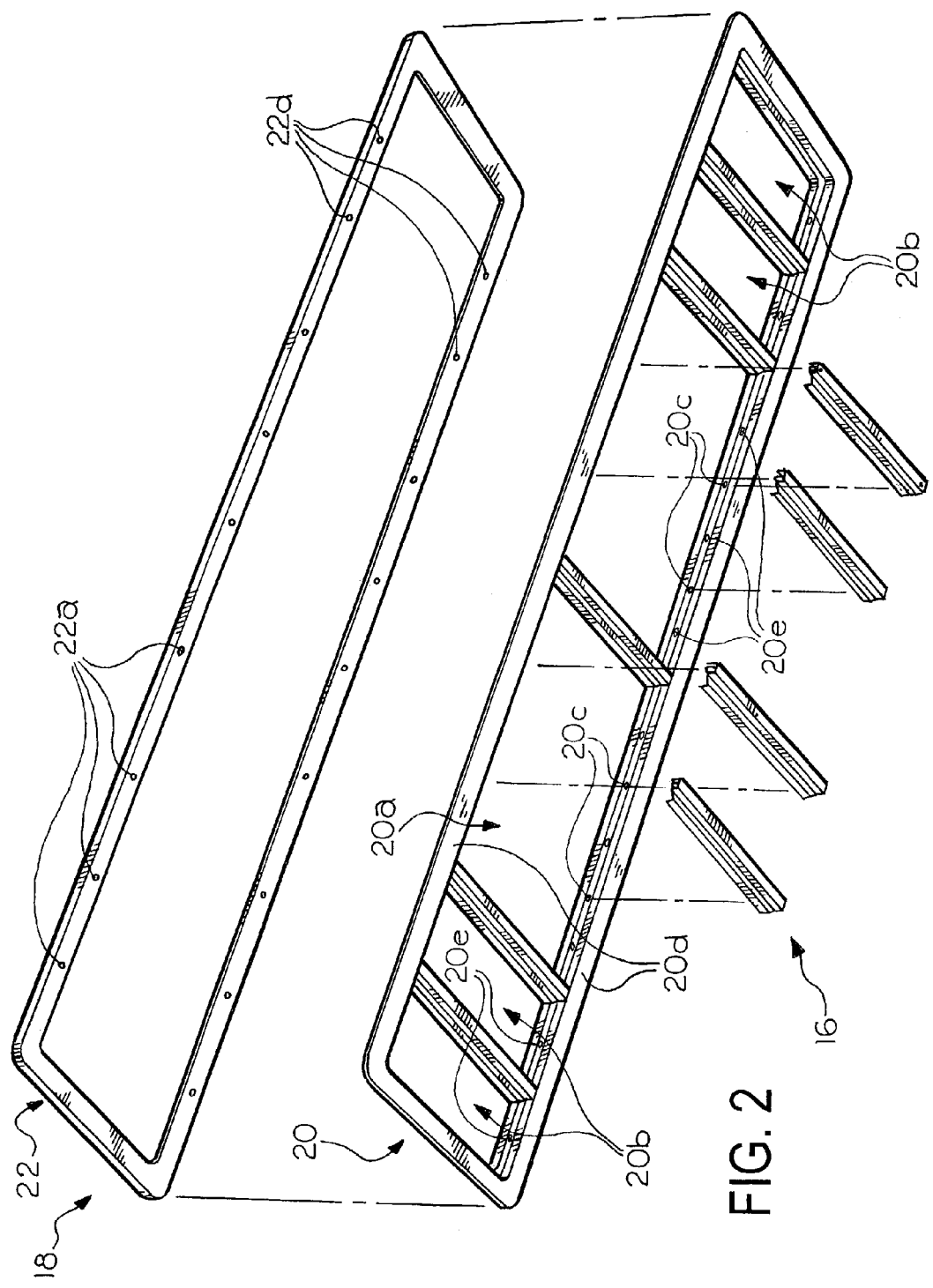
FIG. 2 is an exploded perspective view of a console assembly according to the present invention showing up to ten slots.

The present invention is not intended to be limited to the console 10 shown in FIG. 1, which has an opening 12a that can be divided into two slots for receiving two separate modules. Instead, a console according to the present invention may be comprised of a bezel that defines an opening that can be divided into any desired number of slots permitted by the area in the motor vehicle. For example, as shown in FIG. 2, a console 18 according to the present invention may include a bezel 20 that defines an opening 20a which can be divided into up to ten slots 20b for receiving up to ten modules when nine dividers 16 are used. The bezel 20 may be attached to the roof panel of the motor vehicle with a retainer 22 via fasteners (not shown) and sockets 22a and 22d, similar to that described above.

Figure 3C:
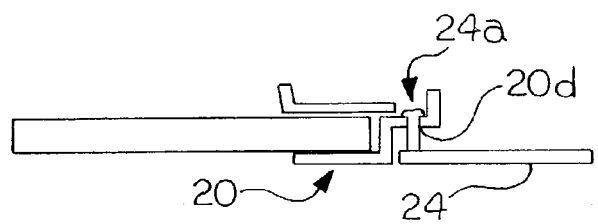
Figure 3D:
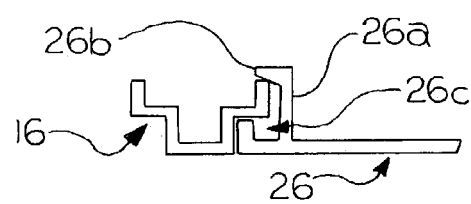
Figure 3E:
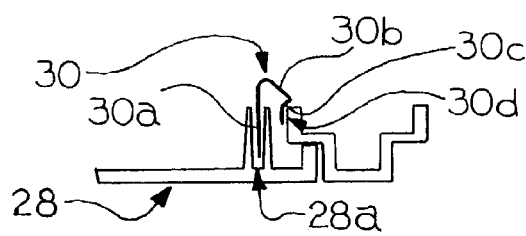

In a preferred embodiment of the invention, the bezel 20 is provided with a plurality of discretely or incrementally spaced sockets 20c disposed along opposing sides 20d thereof. The dividers 16 are adapted to extend laterally across the opening 20a and the fasteners 16a engage opposing sides 20d of the bezel 20 to attach the divider 16 thereto. The dividers 16 can be arranged according to the number and the size of the modules received by the bezel 20. The modules have a footprint that mates with the bezel 20 and the divider 16 so that the module is substantially flush with the bezel 20. Moreover, the modules are configured to engage the bezel 20 and/or the divider 16. For example, there is illustrated in FIG. 3C a module 24 having a heat stake 24a extending upwardly therefrom. The stake 24a passes through a socket 20e in the bezel 20. An upper end of the stake 24a is deformed by heat to prevent the stake 24a from escaping from the socket 20c and thus holds the module 24 in place, flush against the bezel 20. In another example, a module 26 has a resilient fastener in the form of an upwardly extending leg 26a with a foot 26b extending transversely therefrom, as illustrated in FIG. 3D. The foot 26b has a surface which cams against a side portion of the divider 16. This flexes the leg 26a in a direction away from the divider 16 (i.e., to the right when viewing FIG. 3D). Below the foot 26b is a nook 26c with sufficient space to capture the side portion of the divider 16. The leg 26a snaps back to hold the module 26 in place flush against the divider 16. In yet another example, a module 28 has an upwardly extending groove 28a therein, as illustrated in FIG. 3E. The long leg 30a of a J-hook 30 is inserted into the groove 28a. This leg 30a has barbs (not shown) extending therefrom that resist movement of the leg 30a from the groove 28a. A shorter leg 30b has a detent 30c. The shorter leg 30b has a surface which cams against the side portion of the divider 16. This flexes the shorter leg 30b in a direction away from the divider 16 (i.e., to the left when viewing FIG. 3E). Below the detent 30c is a nook 30d with sufficient space to capture the side portion of the divider 16. The shorter leg 30b snaps back to hold the module 26 in place flush against the divider 16.

Figure 3F:
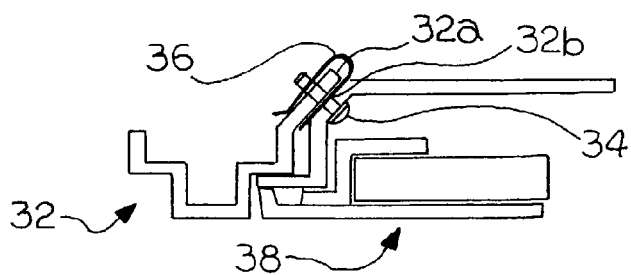

A modified divider 32 is illustrated in FIG. 3F. The divider 32 has an extension 32a with a hole 32b therein for receiving a fastener, such as the fastening pin 34 shown. A fastening clip 36 is supported by the extension 32a. The pin 34 passes through the clip 36 and the hole 32b in the extension 32a, where the pin 36 is held in place. This arrangement may be more suitable for larger or heavier modules, such as a DVD player. Such a module is diagrammatically represented as 38 in FIG. 3F.

Figure 4:
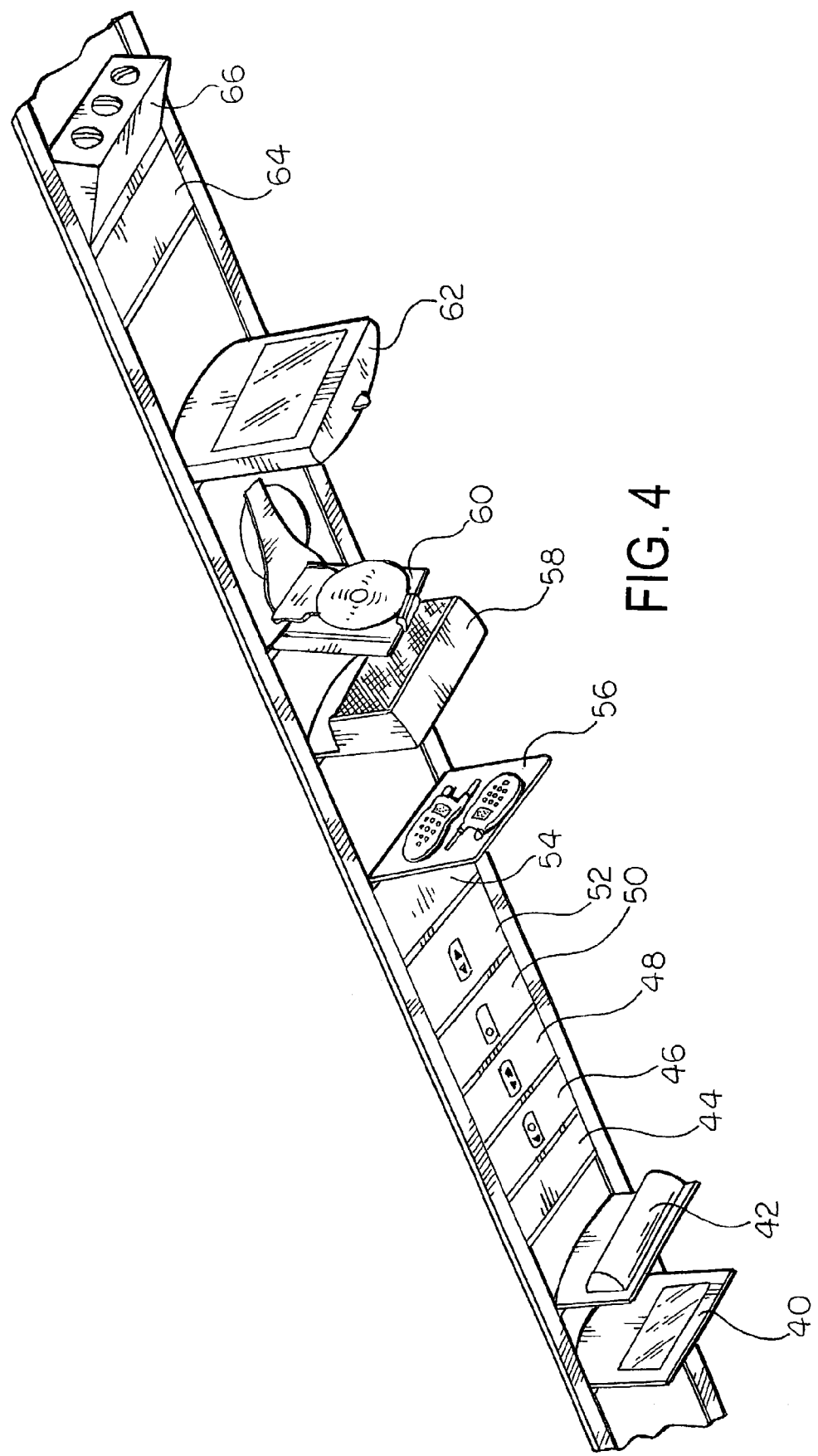
FIG. 4 is a perspective view of the console according to the present invention having a plurality of modules therein.

As illustrated in FIG. 4, a console according to the present invention may be configured to support a variety of modules. This may be easily accomplished merely by placing the divider in a desired location according to the modules received by the bezel. Some modules may require more space than others. Various size modules can easily be accommodated by the incremental placement of sockets in the bezel. A wiring harness (not shown) above the roof panel may connect electrical modules to the motor vehicle electrical system. The console according to the present invention can accommodate a large variety of modules including but not limited to a mirror 40, an eyeglass bin 42, a garage door opener 44, a map light 46, a R/C dome lamp 48, electronics 52, an air filter 54, walkie-talkie storage 56, a storage bin 58, a CD or DVD disk holder 60, a DVD screen 62, a second row reading lamp 64, and a climate control 66. Empty slots can receive modules in the form of blanks, such as the blank 50 shown. A console according to the present invention is suitable for easy post-sale installation of OEM modules. Moreover, the console can easily accommodate after-market modules that are configured to mate with the bezel and divider.

In the preferred embodiment of the invention, the console does not have a wiring harness attached thereto, or integral therewith. It is most preferably a housing for containing modules. A wiring harness may be contained in the roof structure, above the console. This makes the invention more versatile since modules may be contained virtually any place in the console that space and the harness permits.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle console assembly comprising:
   a bezel having first and second sides that define an opening;
   a divider that is adjustably supported on said first and second sides of said bezel and divides said opening into first and second slots;
   first and second modules that are respectively received within and fully cover said first and second slots; and
   a roof panel having an opening provided therein, said bezel being disposed within said opening of said roof panel.

2. The assembly of claim 1, wherein said first and second modules are supported on said divider.

3. The assembly of claim 1, wherein each of said first and second sides of said bezel has a plurality of fastening structures provided thereon, and wherein said divider is adjustably supported on said pluralities of fastening structures.

4. The assembly of claim 1, wherein each of said first and second sides of said bezel has a plurality of sockets provided thereon, and wherein said divider has a first and second fasteners provided thereon that are received in respective ones of said pluralities of sockets.

5. The assembly of claim 1, wherein said bezel frames out said opening of said roof panel.

6. The assembly of claim 1, wherein said opening of said roof panel defines edges, and wherein said plurality of modules are disposed between said edges of said roof panel.

7. The assembly of claim 1, wherein said roof panel has upper and lower surfaces, and further including a retainer having a portion disposed against said upper surface of said roof panel, said bezel having a portion disposed against said lower surface of said roof panel such that said roof panel is disposed between said portions of said retainer and said bezel.

8. The assembly of claim 1, wherein said divider is releasably attached to said bezel.

9. The assembly of claim 1, wherein said module is attached to said divider.

10. A vehicle console assembly comprising:
  a bezel having first and second sides that define an opening;
  a divider that is supported on said first and second sides of said bezel and divides said opening into first and second slots;
  first and second modules that are supported on said divider and are respectively received within said first and second slots; and
  a roof panel having an opening provided therein, said bezel being disposed within said opening of said roof panel.

11. The assembly of claim 10, wherein each of said first and second sides of said bezel has a plurality of fastening structures provided thereon, and wherein said divider is adjustably supported on said pluralities of fastening structures.

12. The assembly of claim 10, wherein each of said first and second sides of said bezel has a plurality of sockets provided thereon, and wherein said divider has a first and second fasteners provided thereon that are received in respective ones of said pluralities of sockets.

13. The assembly of claim 10, wherein said bezel frames out said opening of said roof panel.

14. The assembly of claim 10, wherein said opening of said roof panel defines edges, and wherein said plurality of modules are disposed between said edges of said roof panel.

15. The assembly of claim 10, wherein said roof panel has upper and lower surfaces, and further including a retainer having a portion disposed against said upper surface of said roof panel, said bezel having a portion disposed against said lower surface of said roof panel such that said roof panel is disposed between said portions of said retainer and said bezel.

16. The assembly of claim 10, wherein said divider is releasably attached to said bezel.

17. The assembly of claim 10, wherein said module is attached to said divider.

* * * * *